United States Patent Office 3,466,958
Patented Sept. 16, 1969

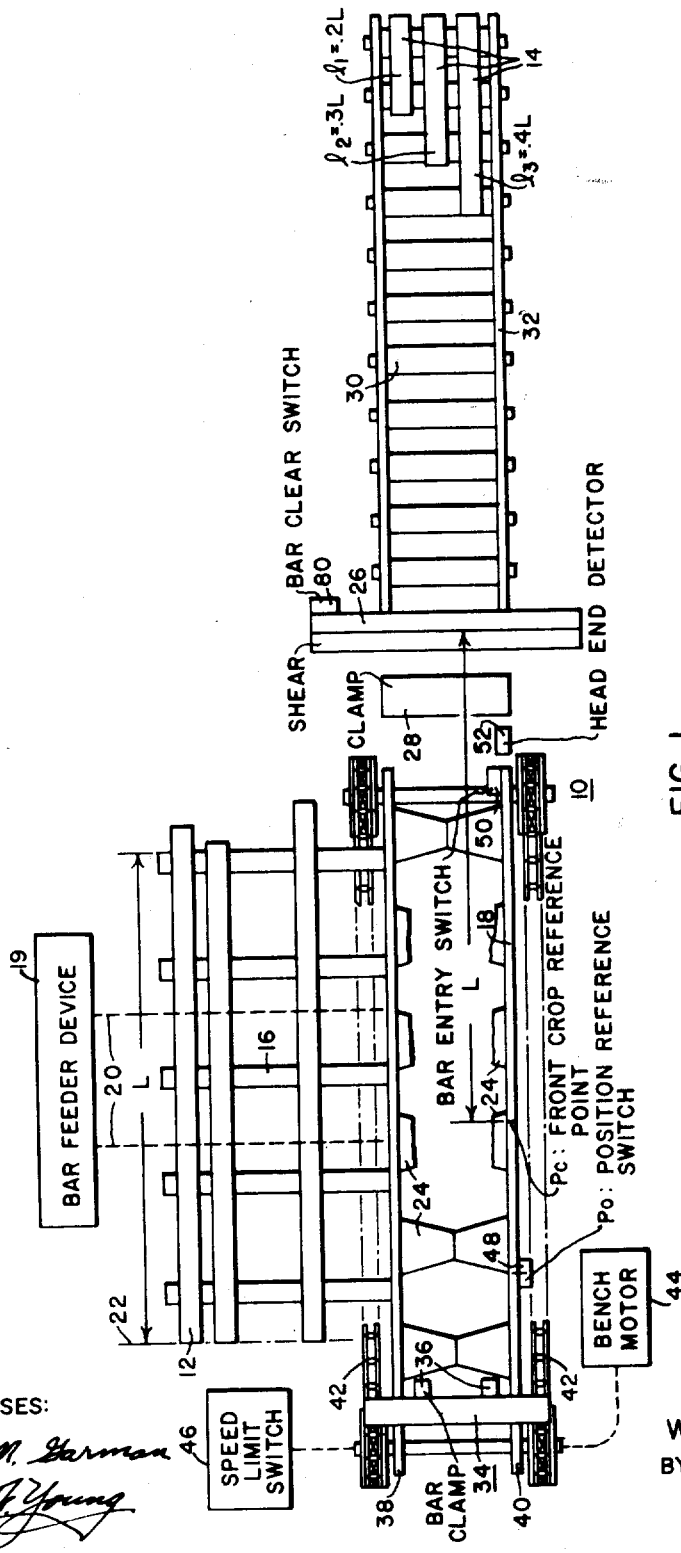
FIG. I.
INVENTOR
William A. Munson

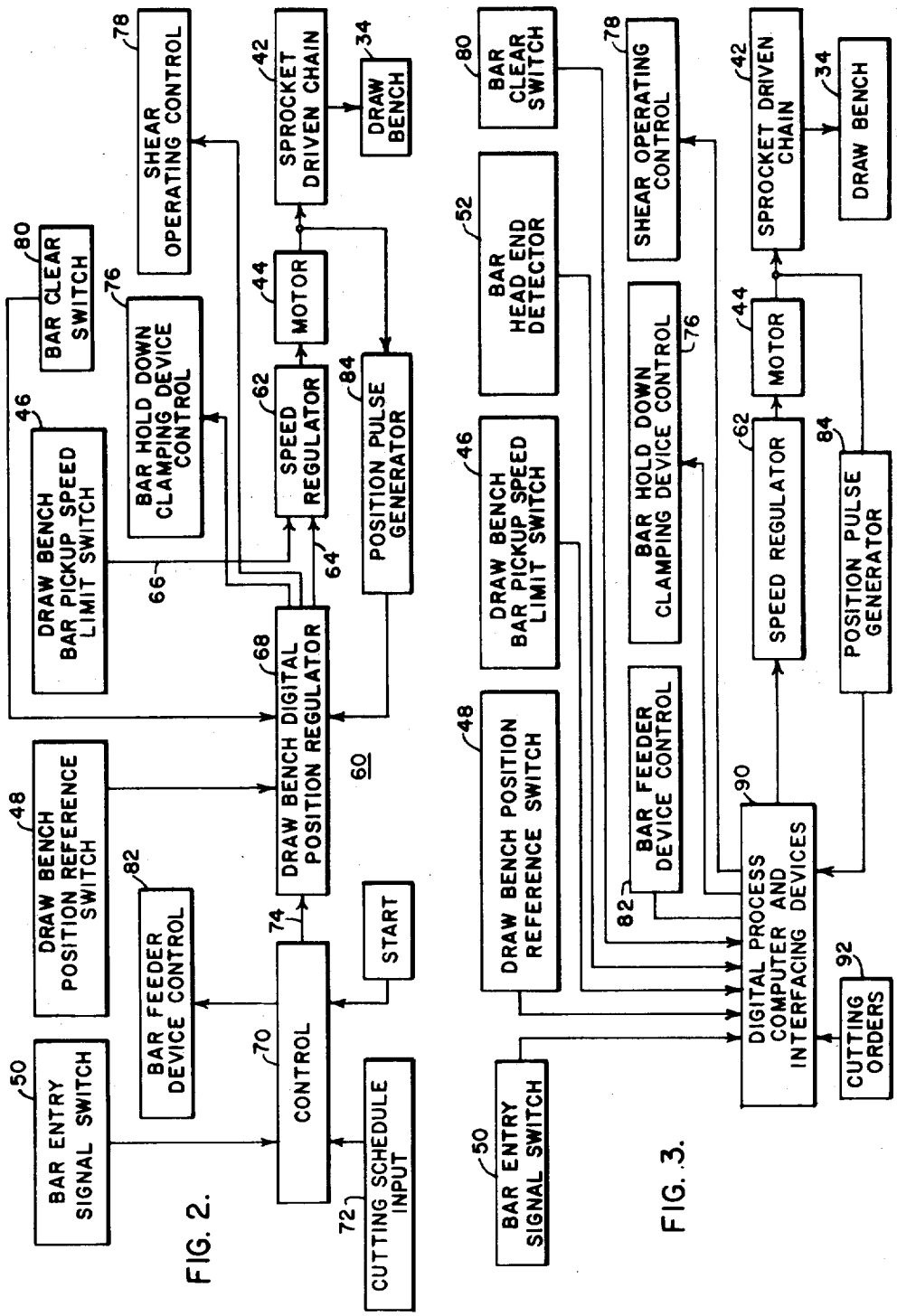

3,466,958
MATERIAL CUTTING CONTROL SYSTEM PROVIDING REDUCED MATERIAL WASTAGE
William A. Munson, Williamsville, N.Y., assignor to Westinghouse Electric Corporation, Pittsburgh, Pa., a corporation of Pennsylvania
Filed Feb. 16, 1967, Ser. No. 616,579
Int. Cl. B26d 5/30
U.S. Cl. 83—71                      10 Claims

ABSTRACT OF THE DISCLOSURE

An elongated unit of material such as a steel bar is controllably positioned for cutting into shorter length product units. Positioning is made with respect to the unit tail end with any required cropping being made at the unit head end. The particular lengths cut are determined by a preprogrammed schedule or by means of real time computer optimization.

BACKGROUND OF THE INVENTION

The present invention relates to material cutting control systems and more particularly to systems for controlling the cutting of steel bars or the like into units or billets of shorter and predetermined varying lengths.

In steel bar mills, bars are typically controllably rolled so as to have a length close to a predetermined length and only those bars having a length greater than the predetermined length are further handled for subsequent cutting into shorter length product units or billets. Short bars become waste or are diverted to some other use.

Bars having the predetermined minimum length are obtained in many cases by selection of only those rolled bars which have a measured length of the minimum length plus some known maximum error associated with the length measuring system. A typical case might involve a minimum bar length of 40 feet, and, with a normally maximum possible measurement error of 6 inches, bars are accepted only if the measured length is 40.5 feet or more.

The minimum length bars may be stored on skids and individually transferred to an entry table from which they are transported to a shear device for cutting into billets. The particular lengths to be provided for the billets are usually determined by the customer orders then being processed. For example, length L may be the minimum bar length and lengths $b_1=0.2L$, $b_2=0.3L$ and $b_3=0.4L$ might be commonly requested billet lengths. Order A may call for $b_1$ billets, order B may call for $b_2$ billets, and order C may call for $b_1$ and $b_2$ and $b_3$ billets. The entire mill order for the day may include any number of additional individual orders.

A relatively simple scheme for dividing the entry bars into the ordered billet lengths is to employ a gauge stop on the delivery side of the shear. The head end of the bar in process is advanced through the shear until it reaches the gauge stop which is at a preset distance from the shear to provide the desired billet length. The shear is operated, the cut billet is delivered and the new head end of the shortened bar is advanced to the gauge stop to produce another billet by operation of the shear. The process is repeated on the same bar until a tail end waste piece remains and a new bar is then entered for the same kind of processing.

In practice, a clamping device is characteristically required at a location near the rear side of the shear in order to hold the bar and especially the bar tail end piece against large bar lifting forces caused by operation of the shear. Thus, the tail end piece of a bar becomes waste if it is shorter than the sum of the billet length being cut plus the distance from the shear to the clamping device. In some cases, the tail end waste piece may be long enough to be stored for processing when an order for shorter billets is to be cut. However, the saving of the waste tail end pieces for possible future use involves storage and inventory expenses.

Changes in billet length are made by manual resetting of the gauge stop location. A number of possibilities exist for the sequence in which billets of the various ordered lengths are cut. For example, bars can be cut to produce all ordered billets of the length $b_1$, then bars can be cut to produce all ordered billets of the length $b_2$, etc. In this billet cutting sequence, the cut billets may include only those required for the subgrouped orders A, B, and C or those for a larger subgrouping of orders or those for the entire mill order of the day.

To reduce tail end wastage, the cutting sequence may instead provide for cutting billets of a common length from each bar in accordance with a schedule which is aimed at meeting billet demand while producing increased billet footage from each bar on the basis of the actual bar length. When employing this sequence, billets of one length may be obtained from one bar while billets of another length are obtained from the next bar, etc.

Another cutting sequence which is still more efficient involves cutting mixed billet lengths from each bar insofar as intermixing can lead to increased billet footage from the processed bars. Typically, information related to billet orders for the day would be placed on cards or tape and entered into a business computer used for this and other electronic data processing purposes. The computer input information would include the type of bar stock from which the ordered billets are to be cut, the minimum length of the bar stock, the different billet lengths required, and the total number of billets to be cut in each length.

The computer is programmed to process the input information with suitable logic flow so as to produce an output specifying the total number of bars required from each bar stock and the particular combination of billet lengths to be cut from each bar so as to yield the most efficient cutting sequence available within the constraints of the process. Since in process billet measurement is always from the head end of the bar, one such constraint is that the total billet footage from each bar must be equal to or less than that value which allows sufficient wastage for safe tail end cropping. The computer program in reflecting this constraint accordingly generates only a relative and not an absolute optimum combination of cut billet lengths from each bar. For example, five billets of length $b_1$ can be cut from a bar of minimum length L but allowance must be made for cropping the minimum length waste tail piece since the actual bar length may be slightly greater than L. Total wastage is then $b_1$ plus any bar length beyond the minimum value L even though another billet length $b_1$ is contained in the waste piece. Similar excessive wastage occurs with other billet length cuttings and with mixed billet length cuttings from the same bar.

It is noteworthy also that in effecting intermixed length cutting in accordance with the computer cutting instructions, substantial time and labor are involved in effecting head and gauge stop resetting to achieve changes in the cut billet lengths. On the other hand, the computer logic flow can include a constraint which limits the frequency with which gauge stop changes are made. However, a restriction on frequency of gauge stop changes cuts back on the freedom to cut whatever billet lengths are required for realizing the minimum bar footage wastage that is otherwise within the operating capability of the system.

Summary of the invention

In accordance with the broad principles of the present invention, improved and more efficient cutting of units of material such as steel bars is achieved in a system generally similar to the kind just described. A control system which operates the system apparatus includes means for sensing the position of the tail end of an entry unit or steel bar after it is transferred by predetermined means to the entry table from the skids or other storage arrangement. Means are provided for controllably positioning the entry unit for successive cutting operations by the shear. The entry unit is thereby divided into shorter length delivery units which respectively extend from the entry unit in process head end to the cutting point in correspondence to a predetermined cutting schedule. Since length measurement is made with reference to the entry unit tail end, the head end of the entry unit can be cropped substantially without crop length limitation to provide for reduced or optimally minimum waste.

In one embodiment, front end cropping is effected to produce a common entry unit working length from which shorter units are cut in accordance with the schedule. In another embodiment, the entry unit head end is sensed in relation to its tail end to produce an actual length measurement and a programmed digital computer is employed to provide real time optimization with minimal crop waste consistent with delivery unit lengths needed to meet existing orders.

It is, therefore, an object of the invention to provide a novel and improved material cutting control system which economically and efficiently provides for cutting entry units into shorter delivery units with reduced wastage.

Another object of the invention is to provide a novel and improved material cutting control system which enables entry units to be cropped to substantially any shorter working length thereby enabling increased or optimal utilization of the entry unit length in producing shorter delivery units.

A further object of the invention is to provide a novel and improved control for a steel bar cutting system which enables steel billets to be produced with reduced wastage and improved efficiency.

An additional object of the invention is to provide a novel control for a steel bar or similar cutting system which enables short entry bars or short entry bar pieces to be cut into shorter delivery units even though such entry units would otherwise be wasted or withdrawn from the cutting system because of crop limitations or other restrictions.

It is another object of the invention to provide a novel and improved material cutting control system which operates with computerized real time optimization and minimizes wastage of entry unit material while meeting the demand for delivery units.

These and other objects of the invention will become more apparent upon consideration of the following detailed description along with the attached drawings.

Description of the drawings

FIGURE 1 shows a schematic diagram of the mechanical arrangement of a steel bar cutting system which is operatively controlled in accordance with the principles of the invention.

FIG. 2 shows a schematic diagram of a control system arranged to operate the bar cutting system shown in FIG. 1 in accordance with the principles of the invention; and FIG. 3 shows a schematic diagram of another control system arranged to control the operation of the cutting system shown in FIG. 1 in accordance with the principles of the invention.

Description of the preferred embodiments

More specifically, there is shown in FIG. 1 a material cutting system 10 in this instance mechanically arranged to process steel bars 12 which can have the minimum length L for cutting into billets 14 of the length $b_1$, $b_2$, $b_3$, . . . $b_n$. Minimum length bars are used in the embodiment of this invention shown in FIG. 2 and are obtained by selection as previously described or by any other suitable means. However, in other embodiments of the invention such as the embodiment illustrated in FIG. 3, the bars 12 need not have a minimum length.

The steel bars 12 are temporarily stored on skids 16 in accordance with conventional practice prior to entry into active processing. A conventional bar feeder device 19 is provided with controlled manipulating arms as represented schematically by dotted lines 20 for the purpose of individually transferring the bars 12 from the skids 16 to an entry table 18. To facilitate placement of the tail end of each bar 12 on the entry table 18 within a predetermined location range along the entry table 18, the bars 12 can be stacked on the skids 16 so that the tail ends are aligned with each other or abutted against a suitable stop as schematically indicated by dotted line 22.

After transfer of a bar to the entry table 18, the bar is disposed on entry table guide rolls 24 which support the bar for longitudinal movement. As the bar is advanced along the entry table 18, its head end passes through a conventional shear mechanism 26 at the delivery end of the entry table 18. As in usual bar cutting arrangements, the system 10 includes a suitable hold-down clamp device 28 located on the entry table side of the shear 26, for example at a spacing of about 6 inches from the shear 26 as previously noted. During advance of the bar along the entry table 18, the hold-down clamp 28 and the shear 26 are in a bar clearance state.

When the in process bar is positioned for a cutting operation of the shear 26, the hold-down clamp is operated to provide fixed hold down force on the bar at the clamp point and the shear is then operated to cut off the portion of the bar extending from the cutting point of the in process bar head end. The remaining entry bar portion is safely held in place, and the cut head end portion can be head end cropping or it can be a product unit or a billet 14 which is moved along rollers 30 of a delivery table 32. The shortened bar is then advanced to a new position and another billet 14 of predetermined length is produced. Bar position control thus determines the head end crop and the billet product lengths.

In practicing the present invention, a draw bench 34 is preferably included as a part of the entry table 18 to effect bar positioning. The bench 34 is movable over the guide rolls 24 and along the top of the entry table 18. After the bench 34 is moved to engage the tail end of a bar 12 on the entry table 18, the bench 34 advances the bar 12 toward the shear 26. The bench 34 stops when the bar 12 is positioned for a shear operation.

After bar cutting, the bench 34 is advanced to position the bar 12 in the next predetermined position, etc. To facilitate bar position control, the bench 34 is provided with conventional clamp arms 36 which are automatically clamped against the sides of the bar 12 at its tail end when the bench 34 first engages the bar 12. After the last bar cutting operation and the bar tail end is removed from engagement with the bench 34, the clamp arms 36 are automatically released and positioned for accepting the next bar.

The bench 34 is suitably supported for operation by a pair of guide tracks 38 and 40 which are located along opposite sides of the entry table 18. The tracks 38 and 40 form respective closed loops so that the bench 34 is repeatedly moved through an oval-like path over and under the entry table guide rolls 24. Thus, after the bench 34 releases a processed bar at the delivery end of the entry table 18, the bench 34 drops downwardly and then moves in a direction away from the shear 26 until it reaches the other end of the entry table 18. It then moves upwardly, picks up a new entry bar and again moves over the guide rolls 24 toward the shear 26. To increase productivity, a pair of draw benches 34 (only one shown) can be employed so that one is approaching the entry end of the entry table 18 as the other is leaving the delivery end of the entry table 18.

Force needed for bench motion is provided by a suitable drive mechanism such as one or more driven chains 42 tied to the bench 34 and located along the bench track loops. The chains 42 are driven by supporting sprockets (not indicated) which, in turn, are driven by one or more conventional D.C. or other motors 44.

Motor energization control defines the extent to which the bench 34 is moved and the rate at which bench motion occurs during any one energization period. Bar position is thus controlled by bench position control, and the rate at which bar position is changed depends on the acceleration, running and deceleration rates of bench position change.

At this point in the description, it is also noted that a switch 46 or other suitable means is located on the bench 34 to sense when bench speed should be limited for bench engagement with the tail end of a bar 12. For example, the bench track 38 is in this case provided with a suitable projecting switch actuator (not shown) along a predetermined track length so as to hold the bench switch 46 in an operated state over a corresponding predetermined distance extending toward or to the bar pickup position.

In order to provide a tail end reference for bar position control, a position reference switch 48 or other suitable means is located at a predetermined position $P_0$ beyond the bar tail end pickup point. The switch 48 is in this case secured to the track 40, and it is actuated by the bench 34 when the leading bench surface reaches the reference position. To facilitate bar transfer from the skids 16 with the bar tail end assuredly located prior to the position reference point, the bars 12 can be stored in alignment on the skids 16 as previously described.

Another switch 50 or other suitable means is secured to the track 40 at the delivery end of the entry table 18 and it is operated by the bench 34 at a bench position following bar tail end release by the bench 34. A signal is thus made available for initiating the transfer of a new bar to the entry table 18 from the skids 16.

In connection with the control system embodiment of FIG. 3, a bar head end detector 52 such as a photocell device or a sonic detector device is located at a predetermined track position near the delivery end of the entry table 18. The position of the detector 52 is preset to be beyond the initial head end position of all bars transferred to the entry table 18 from the skids 16.

With reference now to the embodiment of the invention shown in FIG. 2, a control system 60 operates the draw bench 34 to position bars having greater than minimum length L for front cropping to a common fixed length such as the minimum length L. The system 60 controls bar position in accordance with a programmed cutting schedule which defines the billet lengths and any additional front cropping to be cut from each bar. Substantial reduction in crop wastage is thus achieved since the front cropping length can be freely set to be substantially any value thereby resulting in remaining bar footage exactly equal to the sum of the predetermined billet lengths to be cut from the bar. No hold down problem exists during the last billet cut on the bar since the tail bar portion which forms the last billet will in practice always have a length greater than the distance between the shear and the hold down clamp.

As previously considered, the best conventional cutting system controls are limited in waste control effectiveness. This limitation is primarily due to the varying lengths of entry bars coupled with the fact that in process tail end bar portions can be tail cropped to produce a billet only if the tail end bar portion has footage equal to or greater than the scheduled length plus the distance between the shear and the hold-down clamp device.

In the system 60, a conventional speed regulator 62 is provided with a set point signal 64 which determines the operating speed of the motor 44 over the range from zero speed to run speed. The set point signal 64 can be ramped to control the motor acceleration or deceleration rate. As indicated by the reference character 66, motor speed is limited for bar pickup by an override signal from the signal switch 46. Each time the command bench position is reached, the motor 44 is stopped and it is restarted after a new command bench position is instructed.

Position control is provided by a conventional digital position regulator 68, and the schedule of successive command positions is transmitted to the position regulator 68 by a master control 70. The overall cutting schedule is preferably computer determined in a manner similar to that previously described and, after system startup, the schedule is entered into the control 70 through an input device such as a tape or card reader 72.

The control 70 can, for example, include an input register which stores all of the billet lengths to be cut from a single bar. The stored cutting lengths are successively transferred to a register in the position regulator 68 as indicated by the reference character 74. After the bar tail end is properly positioned at point $P_c$ (FIG. 1), the holddown clamp device 28 and the shear 26 are sequentially operated by respective controls 76 and 78 to front crop the bar to the fixed length L.

Any specified additional front crop length is entered into the position regulator register, and the bar is positioned accordingly for the added cropping operation. A bar clear switch 80 operated by the shear 26 provides a signal which initiates bar unclamping for the cropping as well as subsequent bar positioning operations. The position regulator register is cleared after front cropping is completed and the first billet length cutting command is entered from the control 70. The bar is again positioned, and the clamp 28 and the shear 26 are again operated. Next, the regulator register is again cleared to accept a new position command.

The positioning operation is repeated until the in process bar cutting schedule is completed. The control register is then cleared, a new bar cutting schedule is entered into the control 70 from the input 72, a new bar 12 is transferred to the entry table 18 by logic operation of the feeder device 19 through a control 82 following bench signaling from the switch 50, and the new bar is front cropped to the fixed minimum length L. The new bar 12 is then cut according to the control schedule just entered into the control 70.

Operation continues as described until the programmed mill orders are filled. Alternate schemes for entering and storing command position information can be employed according to the amount of electronic circuitry desired in the control 70 and the position regulator 68. A position error detector controls the level of the digital position regulator output, i.e. the set point signal 64, which is applied to the speed regulator 62. At zero position error, the set point signal 64 drops to zero and the motor 44 is stopped. Error detection is made by comparing the position regulator register command number with the amount of movement of the bar tail end from its reference position $P_0$ as measured by a motor coupled feedback pulse generator 84 or the like. Thus, once the position reference switch 48 signals the position regulator 68, a counter is set at a count higher than a value corresponding to the longest possible bar. Feedback pulses downcount the position regulator counter until it reaches a value corresponding to the bar tail end being located at position $P_c$. The shear 26 is operated to front crop the bar to the minimum length L. Any additional command front cropping is then entered into the position regulator command register and the bar is moved until the error detector reflects the fact that the counter has been downcounted through the added front crop command count value to produce zero error. After execution of the added command front cropping, if any, billet length register entries are successively made and successive corresponding zero error downcountings are effected to produce bar positioning for shear operation.

Where it is economic to use a digital computer for real time control, the embodiment shown in FIG. 3 is employed in steel processing and other applications. As one example, a process computer may be installed for controlling many steel mill functions, and a part of the computer capacity may be made available for bar cutting control. Alternatively, a small digital computer may be economically justified for exclusive use in bar cutting control and related functions.

In FIGS. 2 and 3, like elements are provided with like reference characters. Thus, all of the input sensing devices are coupled through suitable interfacing circuitry to a digital computer as indicated by the reference character 90. The bar head end detector 52 is in this case included with the four signal switches and the feedback pulse generator 84 as input sensing devices. Similarly, the output control devices including the motor speed regulator 62, the shear operating control 78, the hold-down clamping device control 76 and the bar feeder device control 82, are interfaced with the computer output.

In the computer control embodiment, absolute real time optimization is achieved since the actual length of each bar is determined and optimum billet length cuttings are then calculated and performed for the individual bars. Thus, entry bars 12 need not be front cropped to some fixed minimum length, and in addition entry bars need not even be sorted or preselected to have any particular minimum length. Random bar length can be entered and optimum cuttings are still made. However, some bar length preselection is desirable since constraints can otherwise be placed on the possible extent of bar wastage minimization.

As a simplified example, entry of bars having lengths randomly ranging from $1.3b_1$ to $1.9b_1$ would result in optimally minimum but substantial waste for a cutting schedule calling only for $b_1$ billets, whereas entry of bars having a length close to and greater than a minimum value of $2b_1$ would result in optimally minimum and small bar wastage for the same cutting schedule. Normally, the source from which bars are obtained would have sufficient output control to limit the available bar length within a reasonable range of variation.

The bar position reference switch 48 and the head end detector 52 are physically separated by a distance greater than the greatest entry bar length. As previously indicated, bar entry occurs with the tail end located before the position reference switch 48 at $P_0$. Further the bar head end is located before the head end detector 52.

After the position reference switch 48 is operated by the bench 34, the computer counts feedback pulses until the head end detector 52 is operated by the bar head end. When the head end detector signal is accepted by the computer 90, the actual in process bar length is calculated on the basis of the counted tail end movement and the fixed distance between the position reference switch 48 and the bar head end detector 52.

Prior to cutting operations, billet order data is fed into the computer through a suitable input device 92 such as a card reader or a teletypewriter. The total order data is stored and used in a program having predetermined logic flow designed to determine which ordered billet lengths should be cut from the in process bar for optimal minimization of bar waste once the actual bar length is known. The program rules can reflect the frequency with which bars having the actually measured length can be expected to occur on the basis of past mill experience. Real time absolute optimizing control may be directed to minimizing the wastage from each bar but it is preferably directed to minimizing the total bar wastage incurred in filling all of the customer orders entered into the computer 90.

After the front crop and billet length optimal calculations are made and registered, the bar is positioned and front cropped in accordance with the front cropping calculation. Subsequently, in a manner similar to that described in connection with FIG. 2, the bar is positioned for successive billet cuts with the last piece being an exact billet length requiring no tail end cropping as in the case of FIG. 2. After each bar is processed, a new bar is entered, its length is determined for optimizing calculations, and it is then cut to produce the optimally calculated front cropping and billet lengths.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. In a material cutting system having an entry table to which elongated units of the material are successively transferred by predetermined means and further having a hold-down clamping device and a shear through which the entry units are successively moved from the entry table for cutting into shorter length units received by a delivery table, a cutting control system comprising means for sensing the entry unit tail end at least when it is located at a predetermined reference position along the entry movement path and after the entry unit has been transferred to the entry table, means for advancing the entry unit along the entry table to provide for successive entry unit cuttings, means for controlling said advancing means so as to produce successive entry unit cutting positions corresponding to at least one predetermined front end cropping and at least one delivery unit free of tail end waste in accordance with a cutting schedule for the in process entry unit, and means for controlling the shear and the clamping device to provide for entry unit cutting each time the entry unit is advanced along the entry table into a scheduled cutting position.

2. A cutting control system as set forth in claim 1 wherein said position controlling means effects advancement of each entry unit to an initial predetermined tail end position advanced from the predetermined reference position, and said shear and clamping control means produce a front cropping operation on the initially positioned entry unit to make a common fixed working length for all entry units.

3. A cutting control system as set forth in claim 2 wherein said position controlling means has entered therein a cutting schedule program directing a second front cropping of each entry unit as needed to minimize entry unit waste while filling delivery unit orders from preselected minimum length entry units which have been initially front cropped to the common fixed working length.

4. A cutting control system as set forth in claim 2 wherein said system produces steel billets from steel bars.

5. A cutting control system as set forth in claim 4 wherein said advancing means includes a motor driven draw bench supported for tail end bar engagement and having its movement along the entry table controlled by said position controlling means, said position controlling means includes means responsive to said draw bench for indicating when the tail end of an entry bar is located at the predetermined reference position, means for generating a feedback signal representing bench position changes, a digital position regulator responsive to said draw bench response means and said feedback means to move said motor driven bench and locate an entry bar in the initial tail end position, said digital position regulator further being responsive to successive input commands to move an entered bar to successive positions where cutting operations are performed to produce any scheduled additional front cropping and billet lengths corresponding to the input commands.

6. A cutting control system as set forth in claim 5 wherein means are provided for limiting the draw bench speed during entry bar pickup.

7. A cutting control system as set forth in claim 1 wherein means are provided for operating an automatic entry unit feeder device to enter a new entry unit on the entry table after the last cutting operation on the old entry unit.

8. A cutting control system as set forth in claim 1 wherein means are provided for preventing operation of said advancing means unless the shear is clear from an in process entry unit.

9. A cutting control system as set forth in claim 1 wherein means are provided for sensing the position of the head end of an entry unit, said tail end sensing means and said head end sensing means are spaced apart by a distance greater than the actual entry unit length, said position controlling means includes programmed means responsive to said tail end and head end sensing means to compute the actual length of the entry unit and to calculate the front cropping and delivery unit lengths to be cut from the entry unit for small front cropping footage.

10. A cutting control system as set forth in claim 9 wherein said programmed means includes a programmed digital computer, means for interfacing said computer with said sensing means and said advancing means and said shear and clamp controlling means, and the cropping footage calculation results in optimally small total front cropping footage from all entry units processed to fill a specified delivery unit order.

References Cited

UNITED STATES PATENTS

| | | | |
|---|---|---|---|
| 3,157,333 | 11/1964 | Lewis et al. | 83—209 X |
| 3,292,799 | 12/1966 | Eggleston et al. | 83—207 X |
| 3,215,015 | 11/1965 | Neely | 83—363 |

JAMES M. MEISTER, Primary Examiner

U.S. Cl. X.R.

83—207, 209, 280, 282, 364